United States Patent Office 3,592,915
Patented July 13, 1971

3,592,915
TREATMENT OF ANAPLASMOSIS IN ANIMALS
Paul Anthony Barrett, London, England, assignor to Burroughs Wellcome & Co. (U.S.A.) Inc., Tuckahoe, N.Y.
No Drawing. Continuation-in-part of application Ser. No. 388,717, Aug. 10, 1964, now Patent No. 3,382,275, dated May 7, 1968. This application Mar. 6, 1968, Ser. No. 710,789
Claims priority, application Great Britain, Aug. 10, 1963, 31,673/63
Int. Cl. A61k 27/00
U.S. Cl. 424—323                                                    8 Claims

ABSTRACT OF THE DISCLOSURE

A method for the treatment of anaplasmosis in cattle, comprising the intravenous or oral administration of an effective dosage of α-ethoxyethylglyoxal dithiosemicarbazone to the infected animal.

---

This invention relates to the methods of preventing and treating anaplasmosis in cattle. The application is a continuation-in-part of application No. 388,717 of Aug. 10, 1964, now U.S. Pat. 3,382,275 issued May 7, 1968.

In the specification of the above application there are described and claimed substituted glyoxal dithiosemicarbazones, having activity against anaplasmosis in cattle. It has also been stated that some of the disclaimed compounds of this class have been mentioned in the literature, but no activity against anaplasmosis has been attributed to them.

An object of the present invention is to provide a satisfactory method of treating this disease with a compound which shows sufficient high activity without rendering other microbes present in the animal resistant to important antibiotics and antibactericides frequently used in medical and veterinary practice.

It has now been found that α-ethoxyethylglyoxal dithiosemicarbazone, which is a member of the aforementioned group has outstanding activity in this respect and can advantageously be used in the prevention or treatment of anaplasmosis in cattle.

Anaplasmosis is a serious systemic disease of cattle which is prevalent in large areas of the Asian, African, American and Australasian continents and certain Southern areas of Europe which have a mediterranean type of climate. The infecting organism *Anaplasma marginale* attacks the red blood cells of the cattle characteristically causing anaemia, general debility, and fever of the animal, which often prove fatal.

The present invention, therefore, provides a method for the treatment of anaplasmosis in cattle, comprising the intravenous or oral administration of an effective dosage of α-ethoxyethylglyoxal dithiosemicarbazone of the infected animal. Usually a dosage representing about 20 mg./kg. (orally) or 10 mg./kg. (intravenously) is sufficient for this purpose; significant improvements can occasionally be achieved with considerably lower dosages, such as about 5 mg./kg. or even 2.5 mg./kg.

The natural incubation period for anaplasmosis is about 20 to 50 days in cattle. Thus the smallest animal likely to be treated would be a seven-weeks old calf which would weigh about 40 to 50 kg. or more. Treating such an animal would require 200 to 500 mg. at a dose of about 5 to 10 mg./kg., but adult beasts would, of course, require a much larger dose.

The treatment of anaplasmosis in cattle according to the present invention can also be used for the premunition of the animals. After an artificial infection of the animal with a suitable strain of *A. marginale*, the disease is treated with α-ethoxyethylglyoxal dithiosemicarbazone to prevent its further development. The animal remains a carrier of *A. marginale* and develops sufficient premunition to resist subsequent field challenge. It has been found that dosage of about 5 to 10 mg./kg. intravenously administered after the development of parasites gives satisfactory results.

The present invention, in another aspect, provides a method of preventing anaplasmosis in cattle, comprising the repeated intramuscular, subcutaneous or oral administration of α-ethoxyethylglyoxal dithiosemicarbazone in a dosage of about 1 mg./kg. day to the animal for 10 to 30 days. In a further aspect, there is provided a method of sterilising the infection with *A. marginale* in carrier cattle, comprising the oral administration of α-ethoxyethyldithiosemicarbazone at a dosage of about 1 mg./kg. day for up to 30 days. There are many animals which have survived the infection, but remain carriers and a source of further infection, and a treatment with this medicament can eliminate the danger in this respect.

αEthoxyethylglyoxal dithiosemicarbazone may be prepared by adaptation of any of the methods known to be useful for converting compounds containing a ketone or aldehyde group into their thiosemicarbazone derivatives. Conveniently it is prepared by reacting in an acid medium two molecular proportions of a thiosemicarbazide of formula $NH_2NH.CS.NH_2$ with a glyoxal of formula $EtO.CH(Me).CO.CHO$. The reaction may be effected with heating in a solvent, for example ethanol or aqueous ethanol, preferably in the presence of a trace of mineral acid, for example hydrochloric acid, as a catalyst. The compound is in general sparingly soluble and separates from the hot reaction mixture; after filtration and washing, and possibly re-crystallisation, it is obtained in a pure state.

α-Ethoxyethylglyoxal dithiosemicarbazone may be presented in pharmaceutical formulations suitable for oral or parentheral administration. For example, the oral preparations may be tablets, capsules, granules, powder, suspension, or solutions, which may contain diluents, binding agents, dispersing agents, surface-active agents, lubricating agents, coating materials, colouring agents, solvents, thickening agents, suspending agents, or other therapeutically acceptable additives, and these preparations may be presented in unit-dose form or multi-dose form, or as additives to feed-stuffs. The injectable form may be a nonaqueous solution for instance in dimethyl sulphoxide, or suspension in a therapeutically acceptable liquid or mixture of liquids, which may contain bacteriostatic agents, antioxidants, buffers, solutes to render the solution isotonic with the blood, thickening agents, suspending agents, or other therapeutically acceptable additives. Such preparations are presented in unit-dose forms such as ampoules or disposable injection devices, or in multi-dose forms such as a bottle from which the appropriate doses may be withdrawn. All such preparations should preferably be rendered sterile.

For injections, the compound may be presented in the form of a sterile suspension containing up to 20% finely dispersed material in an acceptable medium. Preferably the formulation contains 10% dispersed α-ethoxyethylglyoxal dithiosemicarbazone at an average particle size below 10 $\mu$m., conveniently around 5 $\mu$m., which has an advantageous storage stability viscosity in an aqueous carrier. Other systems, such as 10% suspensions in propylene glycol or isopropylmyristate or 5% solution in dimethyl sulphoxide have also been tested with success.

The following examples illustrate the invention.

EXAMPLE 1

(1) Experimental animals (a) Calves.—The 74 calves used were high grade, predominantly Ayrshire or Friesian, purchased at 1 to 3 weeks of age. These were splenectomised 2 to 3 weeks later and infected within 2 weeks after splenectomy. At that time they were all free of blood parasites and weighed 30 to 52 kg.

(b) Steers.—Twenty-nine Guernsey and Friesian high grade steers, negative to the *A. marginale* complement fixation test (Peterson, Christensen, Henderson, King, Oglesby, Poelma, Ruby and Willers, Proc. 61st Annual Meeting, (1957) were purchased from two farms in Kenya on both of which rigorous tick control was practised. These steers averaged 3 years of age (range 27 to 48 months) and weighed 310 to 540 kg.

While held at the laboratory a strict acaricidal regimen was applied, ticks being controlled by spraying at 4 to 5 days intervals with toxaphene and dioxathion at the manufacturer's recommended concentrations.

(2) Infective inocula

Calves were infected by the intravenous injection of blood containing 1 to 2 strains of *A. marginale*.

(a) Sixty-six were inoculated with the Onderstepoort, South African, strain which had been received from Professor W. O. Neitz and subsequently passaged at this laboratory. An intravenous inoculation of 5 ml. blood exhibiting approximately 20% *A. marginale* parasitaemia (5 to $8 \times 10^9$) parasitised erythrocytes) induced an acute anaplasmosis reaction following a 5 to 7 day prepatent period. The infections recorded here were induced with passages between 110 and 155.

(b) Eight calves were infected with the Nevada, U.S.A., strain of *A. marginale*, kindly provided by Dr. K. L. Kuttler. Two each were infected with the first 4 passages of this strain following resuscitation from a carrier splenectomised calf (20 ml. carrier blood, and 5 ml. blood demonstrating 35%, 8% and 1% parasitaemia respectively). The resultant prepatent period following infection ranged between 15 and 44 days.

The adult steers were infected with 3 consecutive passages (151 to 153) of the Onderstepoort strain. Each animal received 10 ml. infected blood containing 1.9, 2.2 or $3.0 \times 10^{10}$ parasitised erythrocytes according to the inoculum used. These represented parasitaemias of 33%, 35% and 76% *A. marginale*, which induced patent infections following 7 to 12 day prepatent periods.

(3) Test drug

α-ethoxyethylgloxal dithiosemicarbazone was administered in the following formulations:

(a) as a drench made up in water containing:
 (1) micronised powder of mean particle diameter of 5.8 microns;
 (2) dispersible granules of the above powder with a wetting agent;
(b) as an intravenous injection of:
 (1) 10% or 20% aqueous suspension;
 (2) 20% suspension in propylene glycol;
 (3) 20% suspension in isopropylmyristate; (The mean particle diameter in the suspensions was 4.6 microns).
 (4) 20% solution in dimethylacetamide and propylene glycol.

(4) Observations

Giemsa stained, thin blood films were prepared for estimation of parasitaemia; approximately 1,000 erythrocytes were counted and the number of parasitised erythrocytes takes to the nearest whole number percent. Haemoglobin estimations, using the alkaline haematin method of Clegg and King, Brit. Med. J. (1942), were made with a photoelectric colorimeter in comparison with a Gibson and Harrison Standard. In calves, peripheral capillary blood samples were used for these observations but in the steers jugular venous blood, taken into disodium edetate, was used. These observations were made 3 to 7 times a week, being most frequent at the time of patent parasitaemia, and continuing to death or the completion of a relapse. Daily rectal temperatures were taken throughout the trials.

(5) Trials

These trials were intended to evaluate the efficacy of the test compound in controlling both multiplication of *A. marginale* and the pathological consequences thereof in the bovine host during the patent parasitaemia rise of an acute anaplasmosis reaction. In each trial the response in treated groups was compared with the reactions observed in a number of untreated controls.

(a) Splenectomised calves.—Groups of 4 to 8 calves were infected. When the percentage parasitised erythrocytes reached levels of 1% to 59% and were doubling daily, a single treatment was given to calves taken at random, leaving 1 or more calves of each group untreated as controls of infectivity and virulence. The delay between sampling for haematological estimations and treatment was approximately six hours. Forty-two treated calves were controlled by 24 untreated calves, using the Onderstepoort strain and 4 treated calves were controlled by 4 untreated calves using the Nevada strain.

(b) Steers.—The steers were infected with successive passages of the Onderstepoort strain in groups of 7, 12 and 12 with 2, 5 and 5 untreated control animals for the respective groups. Treatment was delayed until clinical anaplasmosis was apparent. The subjects were then showing high parasitaemias (11% to 56%), recordable rises in rectal temperatures and falls in haemoglobin levels.

(6) Results

Results are summarised in the table.

Of 24 untreated control valves infected with the Onderstepoort strain of *A. marginale*, results are only given from 20. Three of those excluded were short to provide infective material for serological antigen production when showing 71, 79 and 80% parasitaemia respectively. The fourth underwent an abnormal, subfatal reaction complicated by the presence of *Theileria mutans* and *Eperythrozoon teganodes*. It reached a peak parasitaemia of 64% and a minimum harmoglobin level of 2.2 g./100 ml. In the controls whose reactions are summarised in the table, peak parasitaemias ranged between 55% and 95%, and minimum haemoglobin levels, generally assessed on the day before death, between 5.4 and 1.8 g./100 ml.

In comparison, the treated calves infected with the Onderstepoort strain experienced less severe reactions. Parasite multiplication and its effects were suppressed by the test drug in both the oral forms at 50 mg./kg. and the 4 formulations given intravenously at 10 mg./kg. The development of anaemia was most effectively controlled when treatment was initiated early in the patent infection, but if delayed until parasitaemia was high, blood destruction was not halted. The single death in treated calves was that of a calf treated when exhibiting a 59% parasitaemia. Parasite multiplication appeared to have been suppressed effectively, this being the peak parasitaemia attained, but the haemoglobin level fell after treatment from 9.8 g./100 ml. to 3.2 g./100 ml., death being attributed to oligocythaemia.

The anaemia was not apparently directly related to the persistence of visible marginal bodies as seen in Giemsa stained blood films. Except in the one fatal case, parasitaemia was invariably reduced to less than 1% following treatment. The parasites, however, did not disappear from the blood immediately after therapy. It was not uncommon to find abnormally small bodies which could be considered as *A. marginale* in 20% to 30% of erythrocytes for up to 20 days following treatment wtihout any evidence of concomitant anaemia.

The Nevada strain of *A. marginale* is less virulent and the difference between treated and control groups, though apparent, is less obvious. A single oral treatment at 50 mg./kg. was relatively more effective against this parasite than against the Onderstepoort strain.

Single intravenous doses of 10 mg./kg. and 5 mg./kg., using the 20% aqueous suspension, were highly effective in controlling further multiplication of *A. marginale* in susceptible steers undergoing clinical anaplasmosis reactions to the Onderstepoort strain. With treatment initiated at relatively high parasitaemia levels (11% to 56%), multiplication appeared to be arrested immediately. The reaction recorded in untreated controls, compared with that of splenctromised calves, was considerably less severe (mortality 5/12) and more variable (peak parasitaemias 6% to 77%). However, even where relatively low parasitaemias were observed in control cattle, significant anaemia developed, the haemoglobin level in the steer with a 6% peak parasitaemia falling from a pre-infection level of 10.5 g./100 ml. to a low of 3.6 g./100 ml.

A feature of the disease in the steers was that the anaemia developed earlier than in splenectomised calves with comparable parasitaemias.

The effectiveness of α-ethoxyethylglyoxal dithiosemicarbazone in controlling the multiplication of *A. marginale* was assessed in accordance with the method recommended for splenectomised calves by Miller, Levy, Torbert and Oglesby, Proc. 89th Ann. Htg., (1952) and for intact cattle by Lotze, Am. J. vet. Res. (1947). The measure of activity against the parasite per se was supported by evidence that treatment also controlled pathological effects usually associated with the multiplication of the parasite. Survival rate was markedly increased, only 1 death occurring in 63 treated animals, and anaemia was effectively arrested.

had been moved into a heavily infected area, whilst 8 out of 10 control cattle previously vaccinated with inactivated or attenuated anaplasma vaccine broke under the challenge and developed the sympotms in the same area during the same period.

I claim:

1. A method for the treatment of anaplasmosis in cattle, comprising the administration of an anaplasmosis effective treatment dosage of α-ethoxyethylglyoxal dithiosemicrabazone to the infected animal.

2. A method according to claim 1 in which the α-ethoxyethylglyoxal dithiosemicarbazone is administered orally or intravenously.

3. A method according to claim 2 wherein the animal is orally administered α-ethoxyethylglyoval dithiosemicarbazone in a dosage of 20 mg./kg. of animal bodyweight.

4. A method according to claim 2 wherein the animal is intravenously administered α-ethoxyethylglyoxal dithiosemicarbazone in a dosage of 5 to 10 mg./kg. of animal bodyweight.

5. A method according to claim 4 in which a formulation containing 5 to 20% of finely dispersed α-ethoxyethylglyoxal dithiosemicarbazone in an injectable liquid medium is intravenously administered.

6. A method according to claim 5 in which the average particle size is about 5 μm.

7. A method of preventing anaplasmosis in cattle comprising the administration of an anaplasmosis prevention TABLE.—ACUTE EXPERIMENTAL ANAPLASMOSIS. A COMPARISON BETWEEN TREATED AND UNTREATED ANIMALS

| Animal type | Infection: A. marginale strain | Treatment with α-ethoxyethylglyoxal dithiosemicarbazone | | | No. of animals | A. marginale parasitaemia [1] | | Reaction/response, haemoglobin g./100 ml. | | | Mortality |
|---|---|---|---|---|---|---|---|---|---|---|---|
| | | Formulation | Dose mg./kg. | Route | | Day T [2] | Peak | Day O [3] | Day T | Min. | |
| Splenectomised calf | Onderstepoort | Micronised powder | 1 x 50 | p./o. | 8 | 19 | 25 | 11.7 | 10.3 | 7.2 | 0/8 |
| Do | do | Dispersible granules | 1 x 50 | p./o. | 3 | 26 | 30 | 10.3 | 11.1 | 7.5 | 0/3 |
| Do | do | Aqueous suspension | 1 x 10 | i./v. | 9 | 23 | 23 | 10.9 | 9.7 | 7.1 | 0/9 |
| Do | do | Suspension in propyleneglycol. | 1 x 10 | i./v. | 9 | 17 | 21 | 10.3 | 8.7 | 6.2 | 0/9 |
| Do | do | Suspension in isopropylmyristate. | 1 x 10 | i./v. | 3 | 6 | 11 | 8.9 | 9.3 | 6.9 | 0/3 |
| Do | do | Solution in dimethylacetamide and propylene glycol. | 1 x 10 | i./v. | 10 | 20 | 24 | 11.8 | 10.3 | 7.2 | 1/10 |
| Do | do | Untreated controls | | | 20 | | 82 | 10.8 | | 3.1 | 18/20 |
| Splenectomised calf | Nevada | Micronised powder | 1 x 50 | p./o. | 4 | 9 | 9 | 11.2 | 8.9 | 7.5 | −0/4 |
| Do | do | Untreated controls | | | 4 | | 21 | 10.8 | | 4.6 | −0/4 |
| Steer | Onderstepoort | Aqueous suspension | 1 x 10 | i./v. | 10 | 21 | 22 | 10.0 | 7.5 | 6.7 | 0/10 |
| Do | do | do | 1 x 5 | i./v. | 7 | 26 | 26 | 10.8 | 7.0 | 4.4 | 0/7 |
| Do | do | Untreated controls | | | 12 | | 43 | 10.3 | | 3.2 | 5/12 |

[1] Percentage erythrocytes parasitised.
[2] Day of treatment.
[3] Day of infection.

EXAMPLE 2

Two splenectomised calves were fed α-ethoxyethylglyoxal dithiosemicarbazone daily at a dosage rate of 1 mg./kg. for 10 days. On the fifth day they were inoculated with 1.0 ml. anaplasma carrier blood.

Forty-seven days after inoculation the animals showed no prasitaemia.

EXAMPLE 3

Three adult anaplasma carrier Hereford cows were given a dosage of 1 mg./kg. α-ethoxyethylglyoxal dithiosemicarbazone orally. The treated animals were then shown to be negative as compared with the control animals still remaining carriers.

EXAMPLE 4

5 cattle were infected with *A. marginale*. After the development of parasitaemia they were given a single dosage of 10 mg./kg. α-ethoxyethylglyoxal dithiosemicarbazone intravenously, and held in an anaplasmosis-free area for one month.

These animals showed no clinical evidence of anaplasmosis during a five month observation period after they amount of α-ethoxyethylglyoxal dithiosemicarbazone to cattle.

8. A method of preventing anaplasmosis in cattle, comprising a repeated intramuscular, subcutaneous or oral administration of α-ethoxyethylglyoxal dithiosemicarbazone at a dosage of about 1 mg./kg. per day to the animal for 10 to 30 days.

References Cited

UNITED STATES PATENTS 3,265,570   8/1966   Michaels _____ 424—323

OTHER REFERENCES

Dorland: Medical Dictionary, 18th Edition, 1938, pp. 91, 1327 and 1499.

Michaels et al.: J. Parasitalazg, vol. 48, 1962, pp. 891–7.

French et al.: Cancer Research, vol. 20, No. 7, Part 2, August 1960, pp. 505–509 and 519 (No. 22115).

JEROME D. GOLDBERG, Primary Examiner